US005689408A

United States Patent [19]

Song

[11] Patent Number: 5,689,408

[45] Date of Patent: Nov. 18, 1997

[54] MAGNETIC AMPLIFIER

[75] Inventor: Ui Ho Song, Seoul, Rep. of Korea

[73] Assignee: Samsung Electro-Mechanics Co., Ltd., Kyungki-do, Rep. of Korea

[21] Appl. No.: 580,905

[22] Filed: Dec. 29, 1995

[30] Foreign Application Priority Data

Dec. 31, 1994 [KR] Rep. of Korea ....................... 94-40344

[51] Int. Cl.[6] ....................................................... H02H 7/10

[52] U.S. Cl. ................................................ 363/50; 361/79

[58] Field of Search ................................ 363/50, 52, 53, 363/55, 56; 361/18, 79, 86

[56] References Cited

U.S. PATENT DOCUMENTS 4,363,064 12/1982 Billings et al. ........................... 361/57
4,437,133 3/1984 Rueckert .................................... 361/33
4,616,302 10/1986 Mandelcorn .............................. 363/50
4,918,592 4/1990 Shimizu .................................... 363/50

*Primary Examiner*—Matthew V. Nguyen
*Attorney, Agent, or Firm*—Lowe, Price, LeBlanc & Becker

[57] ABSTRACT

This invention provides a small-sized magnetic amplifier with a simple construction. The magnetic amplifier comprises a voltage converting portion composed of a switching element, a transformer and a magnetic amplifier for inducing a pulse signal having a predetermined period and voltage level and converting this pulse signal to a voltage signal, a rectifying and smoothing portion for rectifying and smoothing an output voltage of the voltage converting portion and supplying it for a load, a reset current supplying portion for detecting an output voltage of the rectifying and smoothing portion and comparing it with a predetermined reference voltage, and, when an overvoltage is detected, supplying a reset current to adjust the overvoltage for the output of the voltage converting portion, a reset current limitation portion connected between the voltage converting portion and the rectifying and smoothing portion for forming a discharge loop in which, when a voltage to be outputted from the voltage converting portion has positive value, a flowing current is charged, and when the voltage to be outputted from the voltage converting portion has negative value, the flowing current is discharged, while a discharge path is in direction opposite to a direction of the reset current.

9 Claims, 3 Drawing Sheets

MAGNETIC AMPLIFIER

BACKGROUND OF THE INVENTION

1. Field of the Invention

This invention relates in general to a reset current limitation circuit magnetic amplifier, more particularly to a magnetic amplifier which improves the space efficiency of the magnetic amplifier by reducing the number of coils wound inside of the magnetic amplifier and prevents overheating caused by an overcurrent generated in the magnetic amplifier as well as distortion of the output voltage waveform.

2. Description of the Prior Art

In concurrence with the recent trend of miniaturization of electronic products, multi-functional equipment having various functions unified in one system have been developed. The typical example is a TVCR in which a TV is combined with a VCR.

A SMPS has been frequently used as a power supply of such multi-functional electronic equipments, which converts one input DC or AC power into various voltages and supplies the voltages for necessary circuits. Among the various voltages generated by the conversion of the input power in the SMPS, a main load such as a picture tube of the TV requiring a high voltage is supplied with a main voltage which is stably adjusted to a predetermined setting voltage by a feedback function.

However, the SMPS should generate not only the main voltage but also other voltages to be supplied to circuits other than the main load and also the other voltages should be maintained as a stable output voltage regardless of the variation of the main voltage. A magnetic amplifier is to solve this drawback. The magnetic amplifier automatically adjusts by itself output voltages of the other voltages supplied from the SMPS regardless of the variation of the main voltage.

FIG. 1 shows a circuit diagram of a conventional magnetic amplifier.

The magnetic amplifier is composed of a voltage converting portion 10 for inducing a pulse signal having a predetermined period and voltage level and converting the pulse signal to a voltage signal, a rectifying and smoothing portion 20 for rectifying and smoothing an output voltage of the voltage converting portion 10 and supplying it for a load, a reset current supplying portion 30 for detecting the output voltage of the rectifying and smoothing portion 20 and comparing it with a predetermined reference voltage, and, when an overvoltage is detected, supplying an overvoltage controlling current to adjust the overvoltage for the output of the voltage converting portion 10, and an overcurrent damping portion 40 connected between the voltage converting portion 10 and the rectifying and smoothing portion 20 for supplying a damping current toward a direction opposite to the direction of the overvoltage controlling current to be outputted from the reset current supplying portion 30.

Here, the voltage converting portion 10 is composed of a switching element SW1 for switchably outputting a pulse signal having a constant period, a transformer T1 for inducing the pulse signal to be inputted to a first winding side of the transformer T1 and converting the pulse signal to a voltage signal, and then outputting the voltage signal to a second winding side of the transformer T1, and a first coil L4 of the magnetic amplifier for controlling a width of the output voltage from the transformer T1.

Furthermore, the rectifying and smoothing portion 20 is composed of diodes D1, D2, a coil L3, and a capacitor C1 for rectifying and smoothing the voltage signal from the first coil L4 and supplying it for a load RL.

In addition, the overvoltage detecting portion 30 is composed of resistors R1, R2 for dividing the output voltage Vo of the rectifying and smoothing portion 20, resistors R3, R4 and a capacitor C2 for controlling the flow of the current at a voltage dividing point P1 divided by the dividing resistors R1, R2, a shunt regulator SR1 for detecting the output voltage at the voltage dividing point P1, comparing it with a predetermined voltage, and controlling the output voltage of the rectifying and smoothing portion 20 to be a constant level, resistors R5, R6 for dividing voltage $V_{CC}$ of a separate DC power supply, a transistor Q1 for conducting according to a voltage at a voltage dividing point P2 of the resistors R5, R6 and switchably outputting current of the separate DC power supply, and a diode D3 for rectifying a direct current from the transistor Q1.

Furthermore, the reset current supplying portion 30 is composed of a second coil L5 of the magnetic amplifier wound with the polarity opposite to the polarity of the first coil L4 of the magnetic amplifier of the voltage converting portion 10 and a resistor R5 and a diode D4 for controlling the flow of the current.

Referring to FIG. 1, the first winding side L1 of the transformer T1 is applied with the pulse signal having a fixed width by on/off operation of the switching element SW1. According to the application of the pulse signal, an induced alternating voltage is outputted as a voltage signal with positive and negative polarity to the second winding side L2 of the transformer T1.

In other word, when the switching element SW1 is on, a high level pulse signal is applied to the first winding side L1 of the transformer T1 and a part of the positive signal with positive band is outputted. On the other hand, when the switching element SW1 is off, a low level pulse signal is applied to the first winding side L1 of the transformer T1 and a part of the negative signal with negative band is outputted.

Accordingly, when positive alternating voltage signal appears at the second winding side L2 of transformer T1 according to the ON operation of the switching element SW1, a blocking voltage dependent on a load current is generated across the first coil L4 of the magnetic amplifier to make the pulse width of the alternating voltage induced in the second winding side L2 of the transformer T1 narrow.

At this time, when the pulse width becomes a proper duty cycle, the first coil L4 of the magnetic amplifier is saturated.

On the other hand, when negative alternating voltage signal appears at the second winding side L2 of the transformer T2 according to the OFF operation of the switching element SW1 and the voltage supplied to the load RL is an overvoltage, the transistor Q1 of the reset current supplying portion 30 is conducted and then a reset current overvoltage controlling current from the separate DC power supply $V_{CC}$ is applied to the first coil L4 of the voltage converting portion 10 via the diode D3.

Here, the output of the shunt regulator SR1 is connected to the base of the transistor Q1 to supply a constant voltage so that the base voltage of the transistor Q1 may maintain a proper level to protect the transistor Q1.

At this time, a reference voltage port of the shunt regulator SR1 is connected to resistors R1, R2 for dividing the output voltage Vo via the resistor R3. If the output voltage supplied to the reference voltage port is higher than an internal reference voltage, the shunt regulator SR1 is connected.

Here, as the reset current is larger, the pulse width of the alternating voltage induced in the second winding side of the transformer T1 is greatly reduced and then the width of the output duty becomes narrower. Namely, the magnetic amplifier adjusts the intensity of the reset current to automatically control the pulse width of the voltage induced in the second winding side L2 of the transformer so that the output voltage Vo is maintained constantly-regardless of the variation of the load.

At this time, however, if the reset current is large, owing to a noise caused by a reverse current flowing into the diode D1, an exceeding current is generated in the first coil L4 of the voltage converting portion 10. Such an overcurrent causes a hysteresis loss of a core provided in the magnetic amplifier to increase, and a overheating phenomenon and a distortion of the output signal due to an unnecessarily produced current.

To avoid this problem, a second coil L5 is wound to an iron core wound with the first coil L4, with its polarity opposite to the polarity of the first coil L4, a resistor R8 is connected between the second coil L5 and the second winding side L2 of the transformer T1, and a diode D4 is connected between two diodes D1, D2.

At this time, the first coil L4 and second coil L5 of the voltage converting portion 10 are wound with the ratio 1:1. Therefore, when the alternating voltage of the second winding side L2 of the transformer T1 becomes negative value, since a reset current limitation loop consisting of L2→D2→D4→L5→R8→L2 is formed, the reset current flowing into the first coil L4 via the diode D3 and the reset current flowing into the second coil L5 via the diode D4 are offset one another, thereby the reset current applied to the first coil L4 of the voltage converting portion 10 being limited.

However, in such a conventional magnetic amplifier, the second coil for limiting the current may be omitted according to the miniaturization scheme of the products. Due to this, an unnecessary current generated in the magnetic amplifier can not be controlled effectively. This results in increase of a hysteresis loss in the core of the magnetic amplifier and an overheating as well as an unstable waveform of the output voltage signal.

SUMMARY OF THE INVENTION

In view of these problems, it is an object of this invention of a magnetic amplifier which replaces an overcurrent control loop for controlling an overvoltage controlling current applied to a first coil inside the magnetic amplifier to have a proper intensity with a simple circuit using no a coil so that a space efficiency can be improved and a manufacturing cost can be reduced.

To accomplish the object, according to this invention, a reset current limitation circuit of the magnetic amplifier having a voltage converting portion composed of a switching element, a transformed and a magnetic amplifier for inducing a pulse signal having a predetermined period and voltage level and converting this pulse signal to a voltage signal, a rectifying and smoothing portion for rectifying and smoothing an output voltage of said voltage converting portion and supplying it for a load, and a reset current supplying portion for supplying a reset current to maintain constantly an output voltage (Vo) the circuit comprising a reset current limitation portion connected between said voltage converting portion and said rectifying and smoothing portion for forming a discharge loop in which, when a voltage to be outputted from said voltage converting portion has positive value, a flowing current is charged, and when the portion voltage to be outputted from said voltage converting portion has negative value, the flowing current is discharged, while a discharge path is in direction opposite to a direction of the reset current.

Here, preferably, the reset current limitation portion comprises a first diode for rectifying an output voltage of the voltage converting portion when the output voltage has positive band, a capacitor for charging and discharging the current passed through the first diode, a switching transistor with its drain connected to the input of the first diode and its source connected to the output of the first diode for conducting when the output voltage of the voltage converting portion has negative value and switchably controlling a discharge current of the capacitor to be flown into the output of the voltage converting portion, and a resistor connected between the output of the magnetic amplifier of the voltage converting portion and the loop for supplying the discharge current for the capacitor.

In addition, the reset current limitation portion further comprises a driving voltage control portion for inputting the voltage to be outputted from the voltage converting portion and converting it to a constant voltage with a constant range to be supplied as a driving voltage of the switching transistor.

Furthermore, the driving voltage control portion is composed of a second diode with its cathode connected to the output of the voltage converting portion, a first Zener diode with its anode connected to the anode of the second diode and its cathode connected to the gate of the switching transistor, and a third diode and a second Zener diode connected in parallel to the second diode and the first Zener diode and connected in series with their cathodes opposite one another.

BRIEF DESCRIPTION OF THE DRAWINGS

This invention will be more clearly understood from the description of the preferred embodiments as set forth below with reference to the accompanying drawings, in which.

DETAILED DESCRIPTION OF THE PREFERRED EMBODIMENTS

Now, with reference to FIGS. 2 and 3, a magnetic amplifier according to this invention will be described by way of an embodiment.

Figure 1:
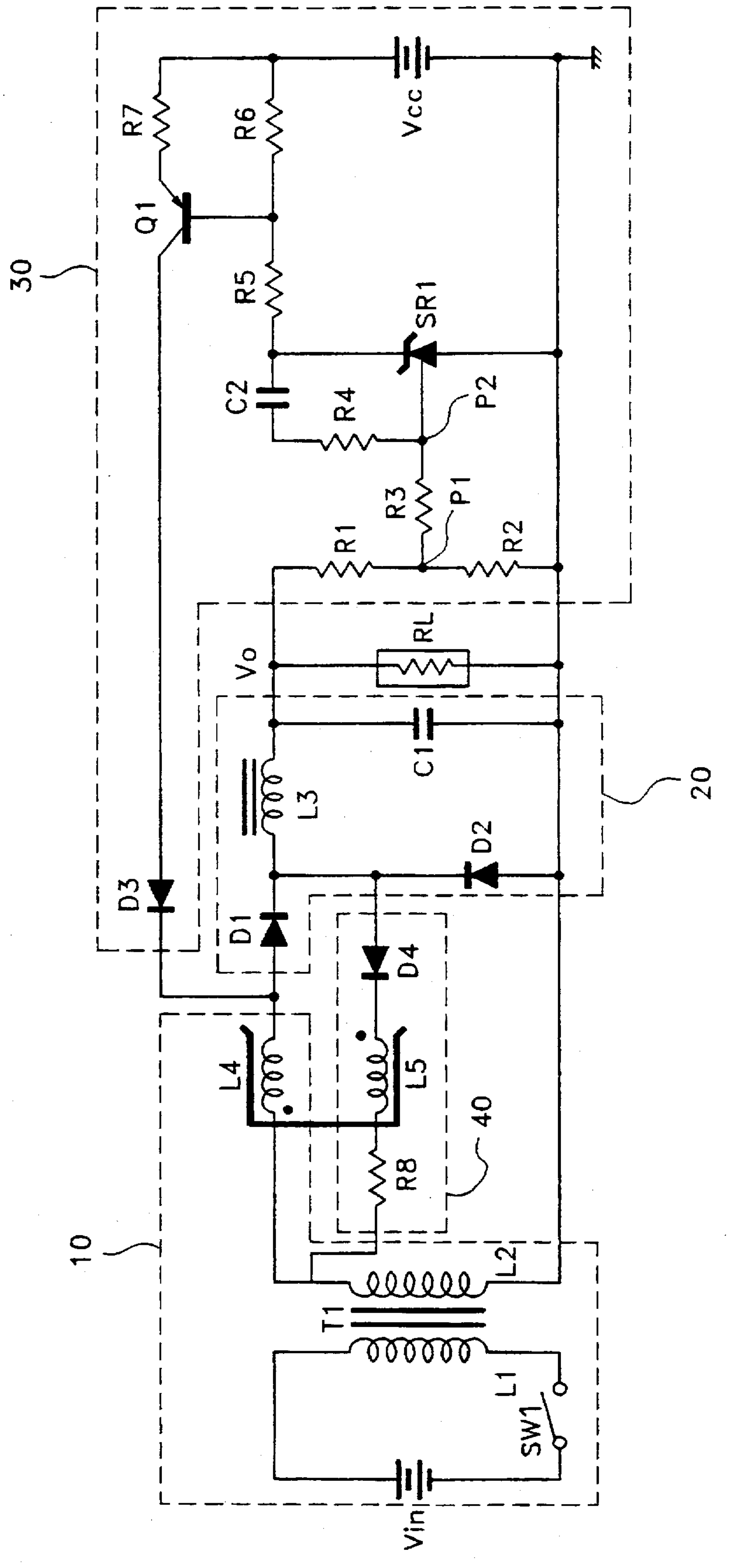
FIG. 1 PRIOR ART
FIG. 1 shows a circuit diagram of a conventional magnetic amplifier.
Figure 2:
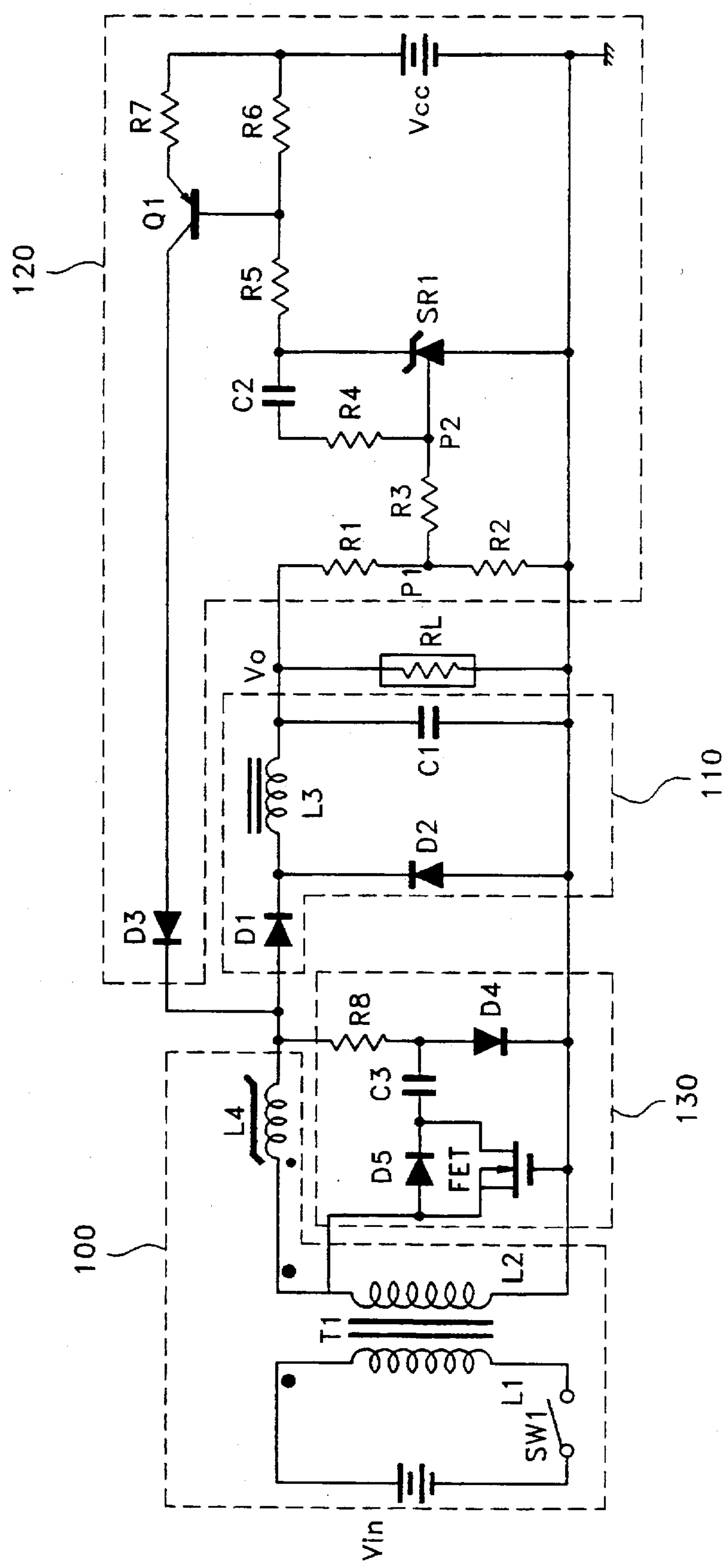
FIG. 2 shows a circuit diagram of a magnetic amplifier of an embodiment according to this invention.

FIG. 2 shows a circuit diagram of a magnetic amplifier according to this invention, which is composed of a voltage converting portion 100, comprising a switching elements SW1, a transformer T1, a coil L4 for magnetic amplifying, a rectifying and smoothing portion 110, a reset current supplying portion 120, and an a reset current limitation portion 130.

Since such a construction is similar to the conventional construction except for the reset current limitation portion 130, only the reset current limitation portion 130 will be described without the description of the constructions other than the reset current limitation portion. The reset current limitation portion 130 is composed of a Field Effect Transistor FET with its gate connected to the ground for turning on when negative voltage appears at a second winding side L2 of a transformer T1, a resistor R8 and a diode D4 connected in series to a first coil L4 of the voltage converting portion 100 and the ground for adjusting a current flow, a diode D5 connected between the drain and source of the FET, and a capacitor C3 connected between the resistor R8, diode D4 and the cathode of the diode D5 for charging a second winding side L2 voltage of the transformer T1 when the FET is off.

Here, a node between the drain of the FET and the anode of the diode D5 is connected to the second winding side L2 of the transformer T1.

Referring to FIG. 2, a pulse signal with a fixed pulse width is applied to the first winding side of the transformer by the ON/OFF operation of the switching element SW1. According to the application of the pulse signal, an induced alternating voltage is outputted as a voltage signal with positive and negative polarity to the second winding side L2 of the transformer T1.

In other word, when the switching element SW1 is on, a high level pulse signal is applied to the first winding side L1 of the transformer T1 and a part of the positive signal with positive band is outputted. On the other hand, when the switching element SW1 is off, a low level pulse signal is applied to the first winding side L1 of the transformer T1 and a part of the negative signal with negative band is outputted.

Accordingly, when positive alternating voltage signal appears at the second winding side L2 of the transformer T1 according to the ON operation of the switching element SW1, a blocking voltage dependent on a load current is generated across the first coil L4 of the magnetic amplifier to make the pulse width of the alternating voltage induced in the second winding side L2 of the transformer T1 narrow.

At this time, the pulse width becomes a proper duty cycle, the first coil L4 of the magnetic amplifier is saturated.

On the other hand, when negative alternating voltage signal appears at the second winding side L2 of the transformer T2 according to the OFF operation of the switching element SW1 and the voltage supplied to the load RL is an overvoltage, the transistor Q1 of the overvoltage detecting portion 130 is conducted and then a reset current, an overvoltage controlling current from the separate DC power supply $V_{CC}$ is applied to the first coil L4 of the voltage converting portion 110 via the diode D3.

Here, the output of the shunt regulator SR1 is connected to the base of the transistor Q1 to supply a constant voltage so that the base voltage of the transistor Q1 may maintain a proper level to protect the transistor Q1.

At this time, a reference voltage port of the shunt regulator SR1 is connected to resistors R1, R2 for dividing the output voltage Vo via the resistor R3. If the output voltage supplied to the reference voltage port is higher than an internal reference voltage, the shunt regulator SR1 is conducted.

Here, as the reset current is larger, the pulse width of the alternating voltage induced in the second winding side of the transformer T1 is greatly reduced and then the width of the output duty becomes narrower. Namely, the magnetic amplifier adjusts the intensity of the reset current to automatically control the pulse width of the sinusoidal voltage induced in the second winding side L2 of the transformer so that the output voltage Vo is steadily maintained regardless of the variation of the load.

At this time, however, if the reset current is large, due to a noise caused by a reverse current flowing into the diode D1, an excessive current is generated in the first coil L4 of the magnetic amplifier. Such an overcurrent causes a hysteresis loss of a core of the magnetic amplifier to increase, and a overheating phenomenon and a distortion of the output signal due to an unnecessarily produced current.

The reset current limitation portion 130 is provided to damp such an overcurrent, in which the FET is turned on when negative voltage appears at the second winding side L2 of the transformer T1. When the FET is turned on, since a discharge loop consisted of FET→L4→R8→C3→FET is formed, then the voltage of the capacitor C3 is discharged, the total current applied to the first coil L4 of the voltage converting portion 100 is a difference between the reset current applied via the diode D3 and the reset current flowing against the current flowing into the first coil L4 through the loop.

In other words, since the reset current applied to the first coil L4 of the voltage converting portion 100 is offset by the current flowing through the reset current limitation circuit loop to damp the reset current, the resultant current to be applied to the first coil L4 is limited.

On the other hand, when positive voltage appears at the second winding side L2 of the transformer T1 according to the 0N operation of the switching element SW1, the FET is turned off and thereby a loop consisted of L2→D5→C3→D4→L2 is formed to charge positive voltage appearing at the second winding side L2 of the transformer T1 to the capacitor C3.

The voltage charged as described above serves as a driving power source of the FET when the second winding side voltage of the transformer T1 has negative value.

Figure 3:
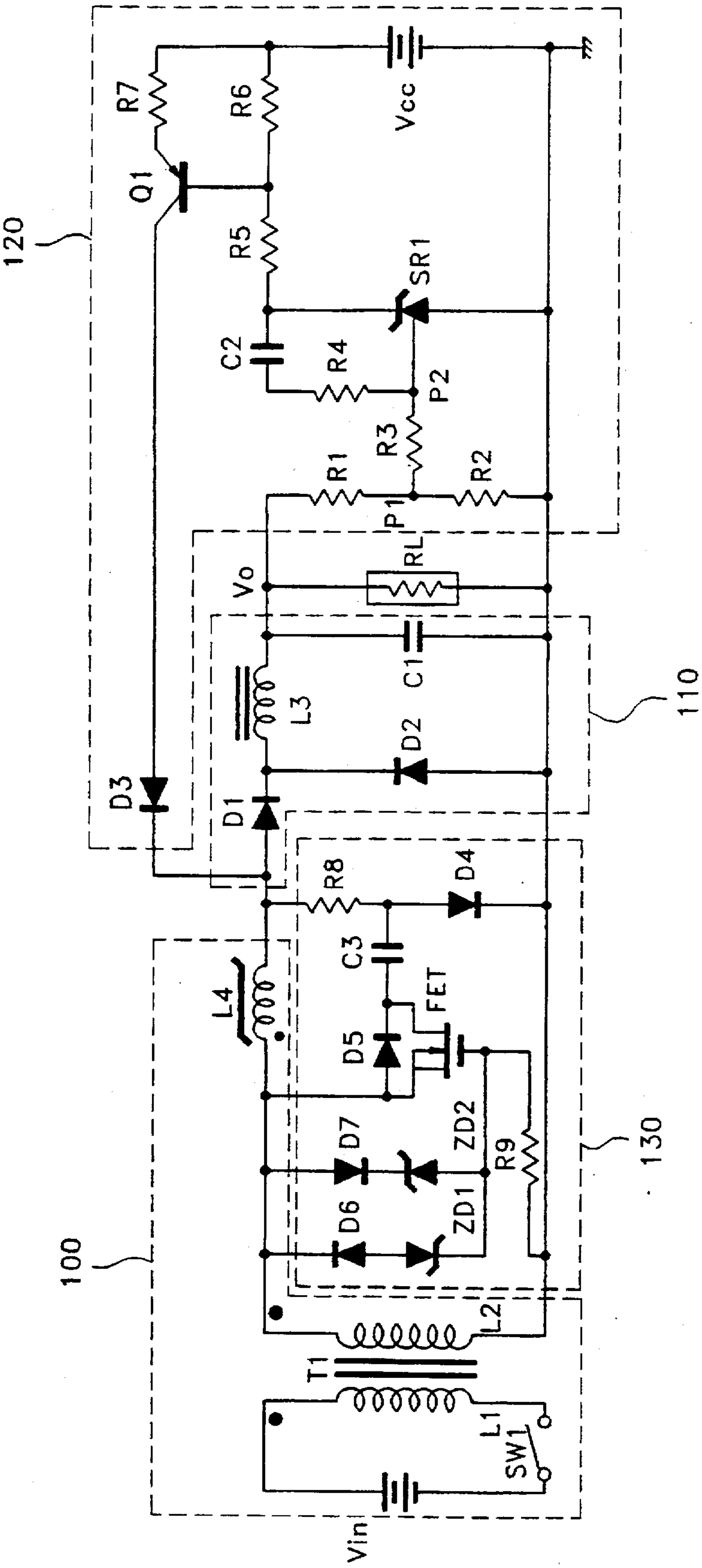
FIG. 3 shows a circuit diagram of a magnetic amplifier of another embodiment according to this invention.

FIG. 3 shows a circuit diagram of a magnetic amplifier of another embodiment according to this invention. In FIG. 3, Zener diodes ZD1, ZD2 directed opposite to each other are connected in parallel between the gate and the source of the FET of the reset current limitation portion 130 in FIG. 2 to maintain the gate voltage of the FET as a constant voltage.

In addition, a diode D6, which is turned on when the first Zener diode ZD1 is conducted, is connected to the first Zener diode ZD1, and a diode D7, which is turned on when the second Zener diode ZD2 is conducted, is connected to the second Zener diode ZD2.

In other words, when the second winding side L2 voltage of the transformer T1 has positive value such that the FET is turned off, the gate-source voltage $V_{GS}$ of the FET is limited to be $-(V_{ZD2}+0.7)$V. On the other hand, when the second winding side L2 voltage of the transformer T1 has negative value such that the FET is turned on, the gate-source voltage $V_{GS}$ of the FET is limited to be $V_{ZD1}+0.7$V to protect the FET and said $V_{ZD1}$ and $V_{ZD2}$ stand for the voltage of the first, second diode ZD1, ZD2, respectively.

As explained hereinbefore, according to this invention, since the space efficiency of the magnetic amplifier is greatly improved by reducing the number of coils inside the magnetic amplifier as less as possible and a semiconductor device for switching performs the function of the coils, heat and distortion of the output voltage waveform which are caused by an unnecessary current are prevented.

What is claimed is:

1. A magnetic amplifier comprising:

a voltage converting means for inducing a pulse signal having a predetermined period and voltage level and converting this pulse signal to a sinusoidal voltage signal;

an output voltage adjusting means for rectifying and smoothing an output voltage of said voltage converting means and supplying it for a load;

an overvoltage detecting means for detecting an output voltage of said output voltage adjusting means and comparing it with a predetermined reference voltage, and, when an overvoltage is detected, supplying an overvoltage controlling current to adjust the overvoltage for the output of said voltage converting means; and an overcurrent damping means connected between said voltage converting means and said output voltage adjusting means for forming a discharge loop in which, when a sinusoidal voltage to be outputted from said voltage converting means has positive value, a flowing current is charged, and when the sinusoidal voltage to be outputted from said voltage converting means has negative value, the flowing current is discharged, while a discharge path is in direction opposite to a direction of the overvoltage controlling current, wherein said overcurrent damping means comprises:

a first diode for rectifying an output voltage of said voltage converting means when the output voltage has positive band; a capacitor for charging and discharging the current passed through said first diode;

a switching transistor with its drain connected to the input of said first diode for conducting when the output voltage of said voltage converting means has negative value and switchably controlling a discharge current of said capacitor to be flowed into the output of said voltage converting means; and a resistor connected between the output of said voltage converting means and capacitor for providing a path along which the discharge current is fed back.

2. A magnetic amplifier as set forth in claim 1, wherein said overcurrent damping means further comprises a driving voltage control means for inputting the sinusoidal voltage to be outputted from said voltage converting means and converting it to a constant voltage with a constant range to be supplied as a driving voltage of said switching transistor.

3. A magnetic amplifier as set forth in claim 2, wherein said driving voltage control means is composed of a second diode with its cathode connected to the output of said voltage converting means, a Zener diode with its anode connected to the anode of said second diode and its cathode connected to the gate of said switching transistor, and a third diode and a second Zener diode connected in parallel to said second diode and said first Zener diode and connected in series with their cathodes directed opposite to each other.

4. A magnetic amplifier as set forth in claim 3, wherein the gate-source voltage $V_{GS}$ of said switching transistor is limited to be $V_{ZD1}$+0.7V when said switching transistor is turned on, the gate-source voltage $V_{GS}$ of said switching transistor is limited to be $-(V_{ZD2}+0.7)$V when said switching transistor is turned off, to maintain the gate voltage of said switching transistor as a steady voltage.

5. A reset current limitation circuit of the magnetic amplifier, comprising a voltage converting portion including a switching element, a transformer and a magnetic amplifier for inducing a pulse signal having a predetermined period and voltage level and converting this pulse signal to a voltage signal, a rectifying and smoothing portion for rectifying and smoothing an output voltage of said voltage converting portion and supplying it for a load, and a reset current supplying portion for supplying a reset current to maintain constantly an output voltage (Vo), the circuit comprising:

a reset current limitation portion connected between said voltage converting portion and said rectifying and smoothing portion for forming a discharge loop in which, when a voltage to be outputted from said voltage converting portion has positive value, a flowing current is charged, and when the portion voltage to be outputted from said voltage converting portion has negative value, the flowing current is discharged, while a discharge path is in direction opposite to a direction of the reset current.

6. A reset current limitation circuit of the magnetic amplifier as set forth in claim 5, wherein said reset current limitation portion comprises:

a first diode for rectifying an output voltage of said voltage converting portion when the output voltage has positive band;

a capacitor for charging and discharging the current passed through said first diode;

a switching transistor with its drain connected to the input of said first diode and its source connected to the output of said first diode and its source connected to the output of said first diode for conducting when the output voltage of said voltage converting portion has negative value and switchably controlling a discharge current of said capacitor to be flowed into the output of said voltage converting portion; and a resistor connected between the output of said magnetic amplifier of the voltage converting portion and capacitor for providing a path along which the discharge current is fed back.

7. A reset current limitation portion of the magnetic amplifier as set forth in claim 6, wherein said reset current limitation portion further comprises a driving voltage control portion for inputting the voltage to be outputted from said voltage converting portion and converting it to a constant voltage with a constant range to be supplied as a driving voltage of said switching transistor.

8. A reset current limitation portion of the magnetic amplifier as set forth in claim 7, wherein said driving voltage control portion is composed of a second diode with its cathode connected to the output of said voltage converting portion, a Zener diode with its anode connected to the anode of said second diode and its cathode connected to the gate of said switching transistor, and a third diode and a second Zener diode connected in parallel to said second diode and said first Zener diode and connected in series with their cathodes directed opposite to each other.

9. A reset current limitation portion of the magnetic amplifier as set forth in claim 8, wherein the gate-source voltage $V_{GS}$ of said switching transistor is limited to be $V_{ZD1}$+0.7V when said switching transistor is turned on, the gate-source voltage $V_{GS}$ of said switching transistor is limited to be $-(V_{ZD2}+0.7)$V when said switching transistor is turned off, to maintain the gate voltage of said switching transistor as a steady voltage.

* * * * *